United States Patent [19]

Kotzab

[11] Patent Number: 4,813,915

[45] Date of Patent: Mar. 21, 1989

[54] TENSIONING DEVICE FOR BELTS AND THE LIKE, IN PARTICULAR ON MOTOR VEHICLE ENGINES

[76] Inventor: Werner Kotzab, Heinestrasse 7, D-8720 Schweinfrut, Fed. Rep. of Germany

[21] Appl. No.: 195,004

[22] Filed: May 17, 1988

[30] Foreign Application Priority Data

May 18, 1987 [DE] Fed. Rep. of Germany ....... 3616571

[51] Int. Cl.$^4$ ............................................. F16H 7/12
[52] U.S. Cl. ..................................... 474/133; 474/135
[58] Field of Search ............... 474/101, 109, 111, 113, 474/114, 115, 117, 133, 135

[56] References Cited

U.S. PATENT DOCUMENTS

| | | | |
|---|---|---|---|
| 4,473,362 | 9/1984 | Thomey et al. | 474/135 |
| 4,583,962 | 4/1986 | Bytzek et al. | 474/133 |
| 4,661,087 | 4/1987 | Henderson | 474/135 |

Primary Examiner—Thuy M. Bui
Attorney, Agent, or Firm—Browdy & Neimark

[57] ABSTRACT

In a tightening device for belts and the like, in particular on motor vehicle engines, having a friction bushing and a helical spring cooperating with the friction bushing, it is provided, in order to attain good cushioning and damping of low-amplitude vibrations and shocks with a simple constructional design, that the wall of the annular gap is embodied deviating from a circular cross section and correspondingly resting against the helical spring in such a way that the pressing force of the helical spring on the friction bushing is reduced or rescinded in an intermediate position established as the basic position in the operating state.

16 Claims, 10 Drawing Sheets

TENSIONING DEVICE FOR BELTS AND THE LIKE, IN PARTICULAR ON MOTOR VEHICLE ENGINES

BACKGROUND OF THE INVENTION

1. Field of the Invention

The invention is directed to a tensioning device for belts and the like, in particular on motor vehicle engines, including a belt diversion wheel, which is rotatably supported on one end of a swivel arm, the other end of the swivel arm being pivotably supported between two end locations about a bearing bush connected to a rotationally fixed housing part. A swivel arm housing is connected to the swivel arm and at least partly surrounds the bearing bush concentrically, leaving a space in between. A friction bushing comprising an elastically deformable material is disposed in the intervening space, while a helical spring is disposed in the annular gap that still remains, the ends of the spring being connected to the bearing bush or to the swivel arm housing in a fixed so as to prvent relative rotation with respect to one another. At least at some points, the helical spring is in contact with the friction bushing.

2. The Prior Art

A device of this kind is known from U.S. Pat. No. 4,473,362. In this previously known device, the helical spring is disposed reltive to the friction bushing in such a way that vibrations of low amplitude are damped by a damping bushing of elastomeric material, while motions of high amplitude are damped via the helical spring and the frictional contact between the friction bushing and the housing moving contrary to it, in such a way that the damping force decreases whenever the swivel arm is moved away from a first end position toward the second end position.

This constructional embodiment would appear, in purely static terms, to be entirely satisfactory in meeting the basic demands made of such a device. However, a more detailed consideration of the dynamic properties, both theoretically and in experimental tests, shows that such a previously known system exhibits an uncushioned, undamped and correspondingly rigid behavior, especially in the presence of low-amplitude vibration. This occurs because before a cushioning or damping effect can occur, the static friction between the friction bushing and the housing must be overcome (this static friction is of course substantially greater than the sliding friction that arises after it has been overcome), and because adequate damping cannot be attained by the elastic deformation of the damping bushing alone.

In the previously known constructions, a virtually constant tensioning force is accordingly sought, while the actual requirements in practical operation are ignored; in that case it is unavoidable that the belt must itself absorb a majority of the shocks and recoiling, which leads to internal friction and relatively major heating of its elastomer components, causing degradation of the elastomer components and hence lessening their durability. In this previously known system, the spring is also incapable of fast enough follow-up, so that when minor shocks occur, the inertia of the system causes belt slippage, which in principle also causes heating and thus shortens the life of the belt.

SUMMARY OF THE INVENTION

It is the object of the invention to provide a device of the above-described type that suitably meets dynamic requirements during operation; that is, belt slippage should be avoided, and the shocks on the belt should be damped to the maximum possible extent, even at low amplitudes. Furthermore, a constructional embodiment is sought which despite the attainment of improved dynamic properties retains conventional housing dimensions, to enable large-scale installation of the device without difficulty.

According to the invention, this object is attained in that the wall of the annular gap is embodied in such a way, deviating from a circular cross section and correspondingly pressing against the helical spring, that the pressing force of the helical spring on the friction bushing is reduced or rescinded, in an intermediate position established as a basic position in the operational state.

The invention accomplishes this by the recognition that when rigidly circular cross sections are used for the walls of the annular gap, as was conventionally the case until now, the helical spring comes to rest against the friction bushing in such a way that precisely at low vibration amplitude, that is, small deflections of the swivel arm, the maximum initial frictional force, in the form of static friction, must be overcome. In contrast, with the embodiment according to the invention, the helical spring is lifted from the friction bushing in such a way that beginning at the intermediate position of the swivel arm, which is established after the mounting of such a device and after the tightening of the belt, in the form of an equilibrium state between belt tension and spring force, there is initially no static friction to be overcome, upon a deflection from this equilibrium position in the positive and negative direction, so that the system can elastically cushion and damp even small shocks. A configuration according to the invention of the annular gap can also be accomplished by providing that each boundary wall of the annular gap intrinsically has a circular cross section, but these boundary walls are not concentric. In any case, the provision according to the invention enables purposeful control of the friction at critical ranges of motion, for instance in the vicinity of the end positions, as well.

It is advantageously provided that the wall of the annular gap facing the friction bushing has at least one cam-like protrusion in the vicinity of the relative motion. As a rule, the embodiment is such that the friction bushing is disposed on the radially inner side of the annular gap, that the friction bushing is enveloped by the helical spring, and that correspondingly the cam-like protrusion is embodied on the radially outer boundary wall of the annular gap, but in principle the embodiment can also be in reverse order.

It is favorably provided that the cam-like protrusion is disposed offset by somewhat more than 90° from the fixation point of the helical spring on the swivel arm housing. Tests have shown that the helical spring rests against the friction bushing approximately around this vicinity of approximately less than 90° from the fixation point. If the cam-like protrusion is now disposed on the opposite wall of the annular gap receiving the helical spring in a manner offset by approximately more than 90° with respect to the fixation point, in the opposite rotational direction, then as a result the helical spring is raised from the friction bushing in the region opposite it by approximately 180°, so that the desired effect can be attained, namely that precisely at low shock or vibration amplitudes, the static friction between the swivel arm housing and the friction bushing need not be overcome first.

At least one end of the helical spring is advantageously disposed in a longitudinal recess that is radially outwardly closed. The provision of a longitudinal recess means that the helical spring can adjust freely in an equilibrium state, because of the axial play provided, and the closure from the outside prevents dirt, oil and the like from penetrating to the interior.

The friction bushing can be stepped in the axial direction, in order to limit the interaction between the friction bushing and the helical spring to one winding, or to a relatively low number of windings.

The friction bushing can also be provided with an annular slit, in a manner known per se, in order to improve its elastic properties.

In an alternative or additional constructional embodiment, it can be provided that the swivel arm housing has a radially extending end face, which is in frictional contact with a stationary abutment face, that may be embodied on the inside of the stationary housing part. As a result, once again a damping effect can be attained, and a defined frictional force can be established by the provision that the end face is pressed against the abutment face by means of plate springs.

In this construction, the basic concept of the invention described above of reducing the static friction in the vicinity of the basic position can be accomplished by providing that the friction face and/or the abutment face have a configuration deviating in such a manner from a flat surface that it is in this basic position in the operational state that the least friction, and in particular no static friction, occurs.

For the sake of particularly simple storage in the form of an intrinsically stable, compact part while simultaneously being easy to assemble, it may also be provided that a screw element axially penetrates the bearing bush and protrudes beyond it, the free end of the screw element engaging the bore of a plastic washer that is disposed on the outside of a stationary housing part. As a result, the entire device is fixed between the screw head and the plastic washer. When the device according to the invention is attached to an engine, the protruding screw end can be inserted into a threaded bore provided there, without the danger of disassembly of the device parts, simply by over-tightening the thread of the plastic washer. This is no longer problematic once the device is in its final position.

For the sake of simple assembly, it is advantageously also provided that the belt diversion wheel has a pierced hub, so that a tool can be introduced into it in order to deflect the swivel arm, in order to tighten the belt counter to the force of the helical spring.

BRIEF DESCRIPTION OF THE DRAWINGS

Further characteristics, advantages and details of the invention will become apparent from the ensuing description of a preferred embodiment, taken in conjunction with the drawings, in which.

DESCRIPTION OF THE PREFERRED EMBODIMENTS

Figure 1:
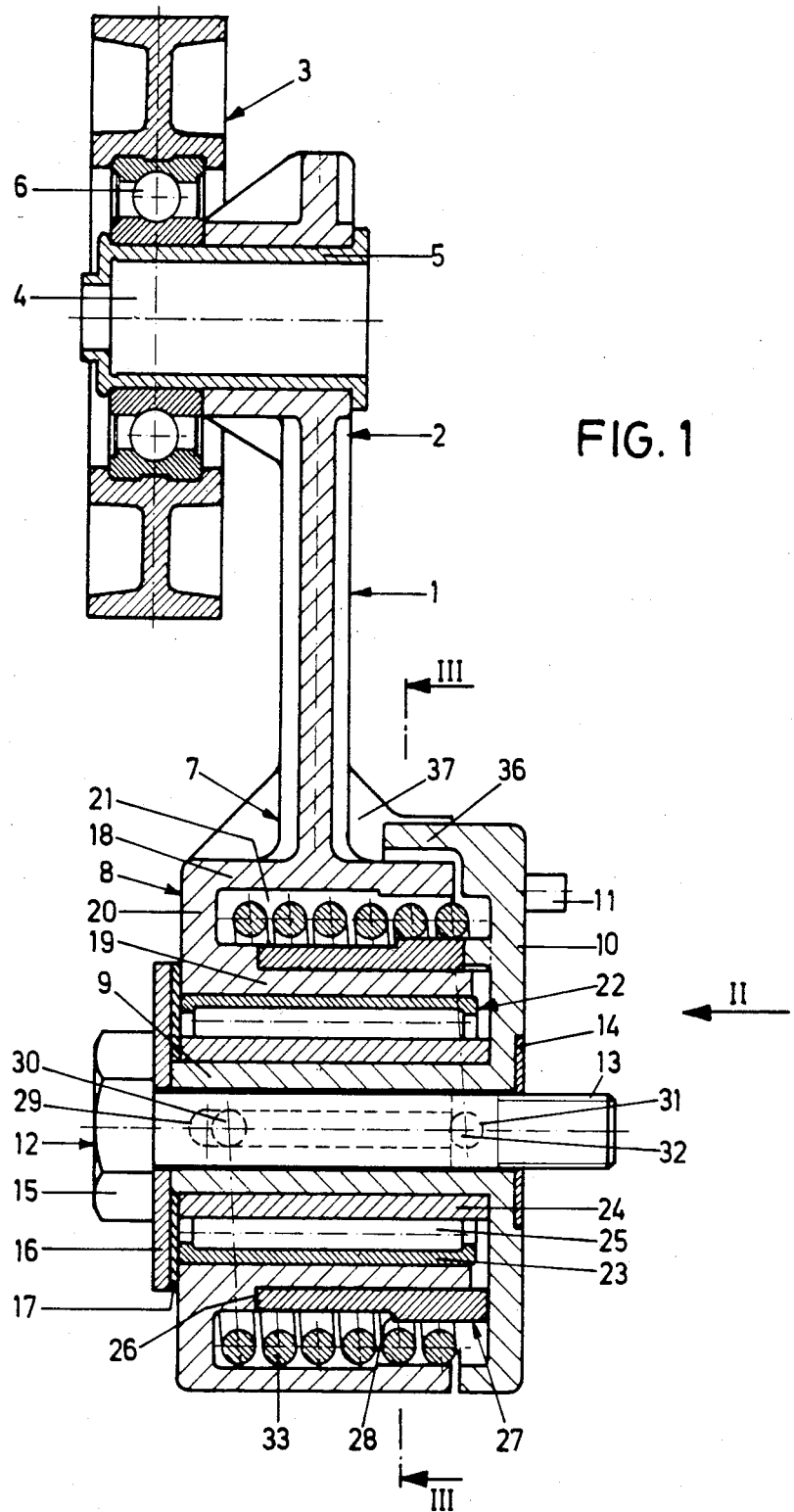
FIG. 1 is a longitudinal section through the entire device according to the invention, taken along the line I—I of FIG. 2.
Figure 2:
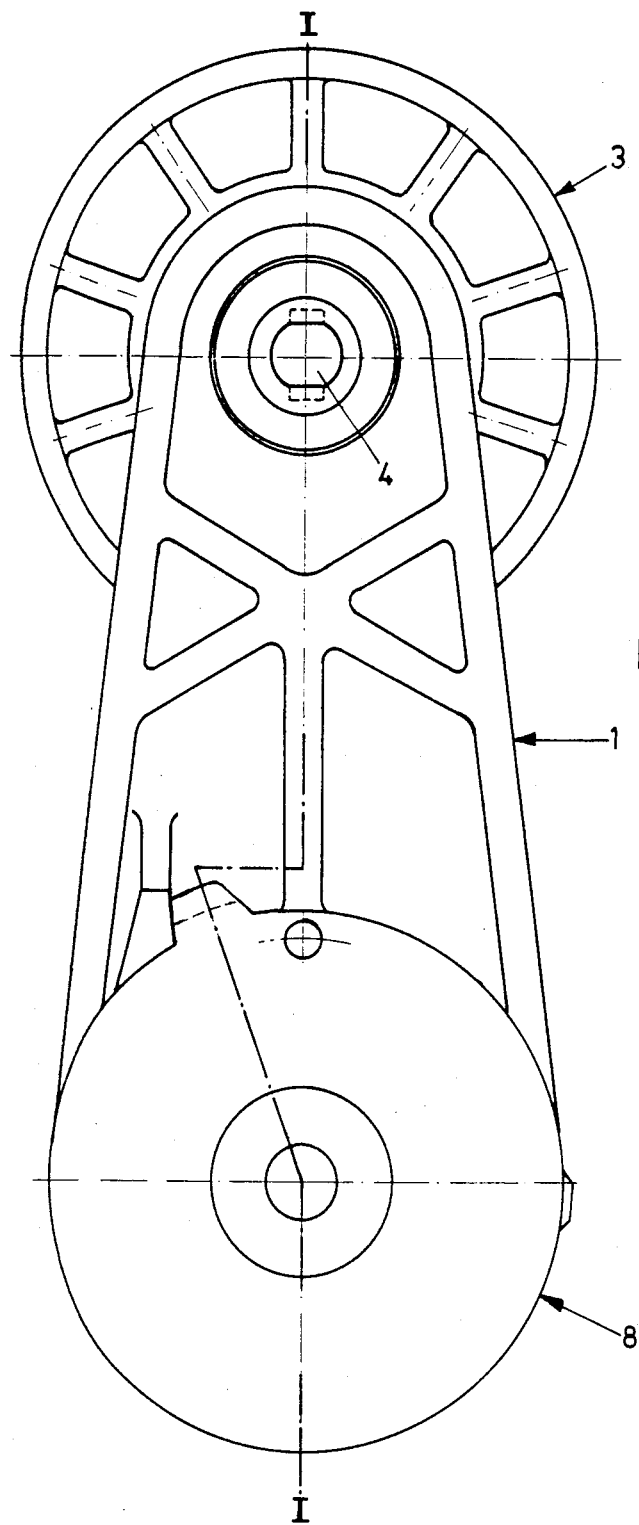
FIG. 2 is a view in the direction of the arrow II in FIG. 1.

A device according to the invention includes a swivel arm 1, on one end 2 of which a belt diversion wheel 3 is rotatably supported on a hub 5, having an opening 4 provided with axial protrusions, by means of a ball bearing 6. The diversion wheel 3 has a double-U profile, in a known manner. The opening 4 makes it possible to engage the hub 5 with a tool during assembly. Disposed on the other end 7 of the swivel arm 1 is a swivel arm housing 8, which cylindrically surrounds a bearing bush 9 that is connected to a stationary housing 10, in the exemplary embodiment being integrally embodied with this housing, the stationary housing 10 closing off the swivel arm housing 8.

The stationary housing 10 has a protrusion 11, which for rotationally fixed connection is inserted into a corresponding recess in a vehicle engine or the like. A screw element 12 axially penetrates the bearing bush 9 and has a threaded portion 13 that protrudes beyond the stationary housing 10, the threaded portion engaging a plastic washer 14 disposed in countersunk fashion on the back side of the housing 10.

The housing 10 and the swivel arm housing 8 are held together by this plastic washer 14, on the one hand, and the screw head 15 or a metal shim 16 beneath the screw head and a rubber washer 17, so that the entire device can be stored and used for assembly purposes as a compact unit. For assembly, the screw element 12 is rotated, and the threaded portion 13 is thereby screwed into a corresponding threaded bore on the engine. In this rotation, the thread and the plastic washer 14 is over-tightened which because of the softness of the material can be done without difficulty and without damage to the threaded portion 13.

The swivel arm housing 8 has an outer cylindrical section 18, which is connected to the swivel arm 1, as well as an inner cylindrical section 19 spaced apart from the outer cylindrical section; these sections 18 and 19 are joined via a radially extending end wall section 20, forming an annular gap 21 that is open toward the housing 10.

A roller bearing 22 is fitted into the inner cylindrical section 19, including roller bearing housing parts 23 and 24 and pins 25. The outer roller bearing housing part 23 is fixed to the inner cylindrical section 19 of the swivel arm housing 8 so as to prevent relative rotation with respect to one another and the inner roller bearing housing part 24 is likewise fixed to the bearing bush 9 so as to be rotationally fixed with respect to one another.

The inner cylindrical section 19 of the swivel arm housing 8 has a stepped recess 26, into which a cylindrical friction bushing 27 is inserted such that it is rotationally fixed relative to the swivel arm housing 8; that is, the friction bushing 27 is connected to the stationary housing 10 in a rotationally fixed manner. The friction bushing is manufactured from an intrinsically elastic material, such as thermoplastics, having a relatively high coefficient of friction as compared with metal.

The friction bushing 27 in turn has a stepped recess 28, so that its outside diameter on the end oriented toward the housing 10 is somewhat greater than farther outward.

In the annular gap 21 formed by the outer cylindrical section 18, as well as by the inner cylindrical section 19 on the one hand and the friction bushing 27 on the other, there is a helical spring 33, the ends of which are fixed, one (the helical spring end 30) in a longitudinal groove 29 closed off from the outside in the outer cylindrical section 18 of the swivel arm housing 8 and the other (the end 32) in a bore 31 of the housing 10. The helical spring 33 rests on the friction bushing 27 with only its first few windings, while some distance still remains between the other windings and the recessed portion of the friction bushing 27.

Figure 3:
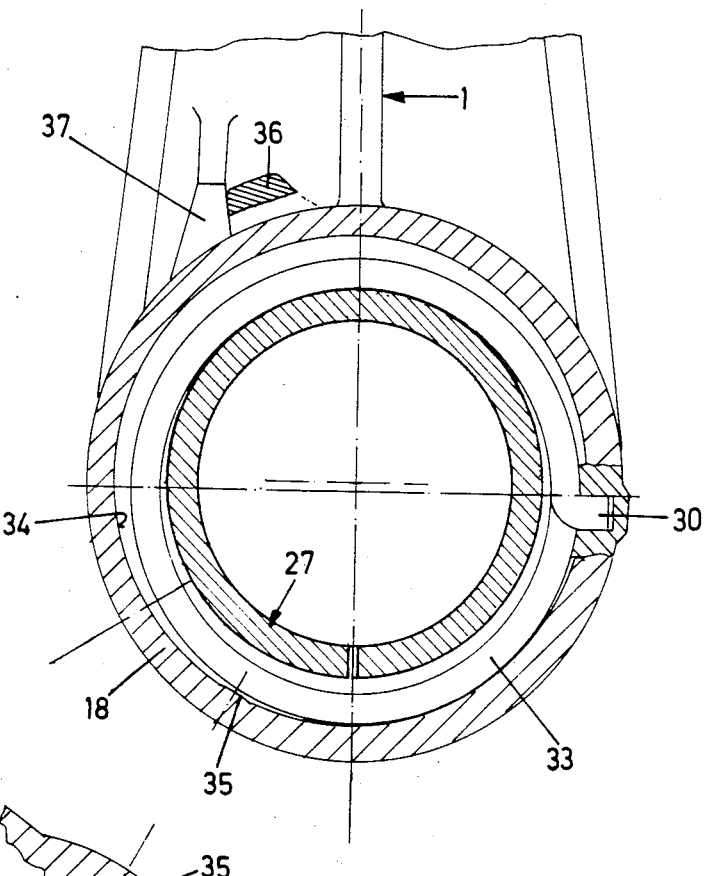
FIG. 3 is a schematic section through the vicinity of the swivel arm housing, taken along the line III—III of the device as shipped.
Figure 5:
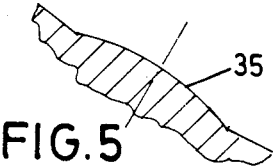
FIG. 5 is an enlarged view of the cam protrusion shown in FIG. 3.
Figure 4:
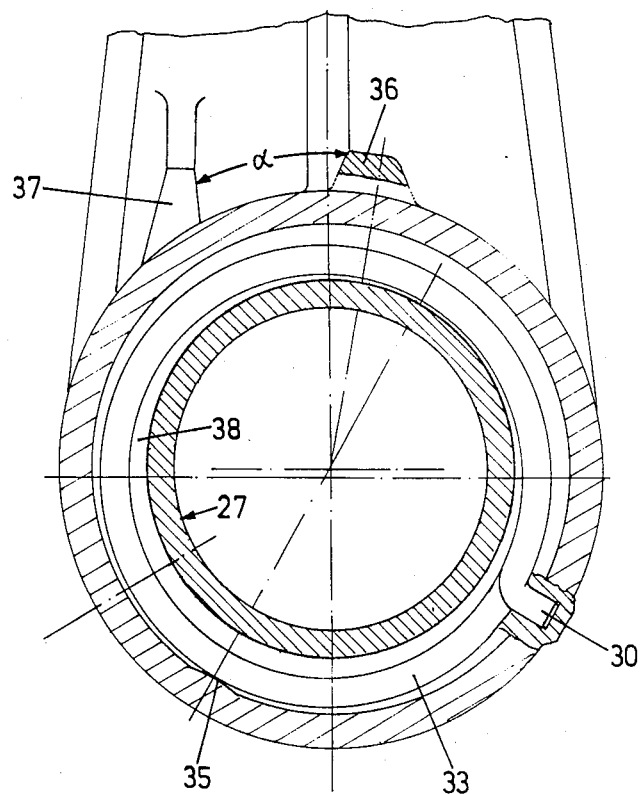
FIG. 4 is a view corresponding to FIG. 3 in the operating state, that is, with the belt tightened.

The following description relates in particular to FIGS. 3-5. These figures show that a cam-like protrusion 35, shown on a larger scale in FIG. 5, is embodied on the inner wall 34 of the outer cylindrical section 18 of the swivel arm housing 8. In the state as shipped or otherwise delivered, shown in FIG. 3, or in other words when the swivel arm 1 is located in a first end position, defined on the one hand by a stop prong 36 on the stationary housing 10 and on the other by a rib protrusion 37 on the swivel arm 1, the first and second spring winding of the helical spring 33 of the friction bushing 27 rests along a region that is substantially 180° opposite the cam-like protrusion 35. If the device according to the invention is now fastened to an engine in the manner described, the swivel arm 1 is deflected outward into the opening 4 by the use of a tool, and a belt, not shown in the drawing, is tightened. Because of the belt tension, which is in equilibrium with the tension of the helical spring 33, the swivel arm 1 is deflected outward by an angular range α relative to the housing 10, as shown in FIG. 4. In this outward deflection, the helical spring 33 is supported on the cam-like protrusion 35, and on the approximately opposite side, where it originally rested against the friction bushing 27, it is raised away from the friction bushing, so that an annularly encompassing gap 38 is produced between the helical spring 33 and the friction bushing 27. As a result, in this state corresponding to the basic position in the operating state, no static friction occurs between the friction bushing 27 and the inner cylindrical section 19 of the swivel arm housing 8, so that even small shocks, which would not be sufficient to overcome the static friction, are intercepted and damped.

Figure 10:
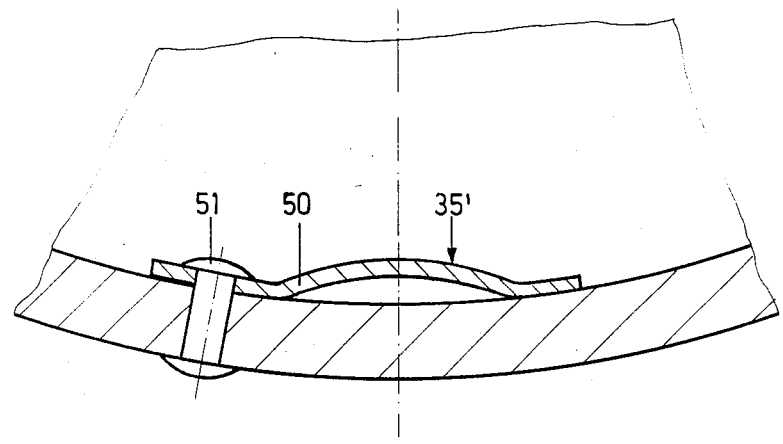
FIGS. 10 and 11 are detailed views taken through a spring-loaded cam-like protrusion.
Figure 11:
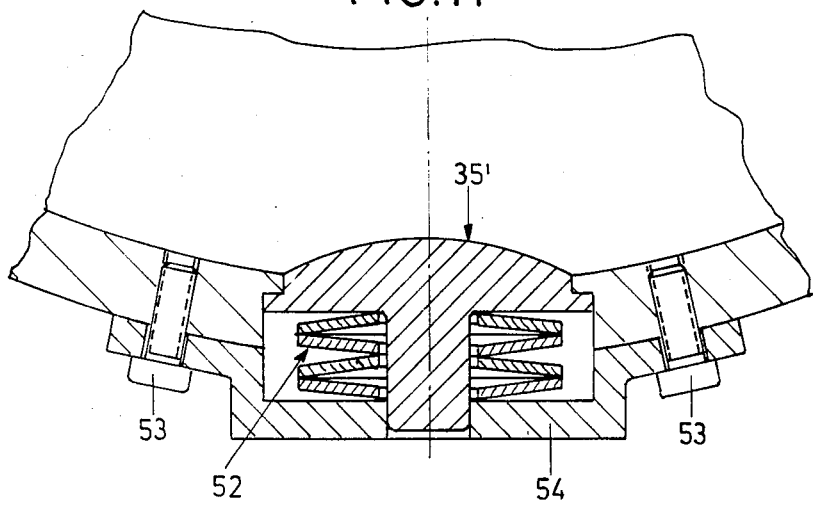

It is not shown in detail in FIGS. 10 and 11 that in accordance with a variant of the invention the cam-like protrusion 35' can also be embodied as a separate housing part, which presses with radial spring loading against the helical spring 33. In the embodiment of FIG. 10, the protrusion 35' is embodied as a leaf spring element 50, which is secured with a rivet 51. In the embodiment of FIG. 11, a plate spring assembly 52 presses against the cam protrusion 35', which is supported against a retaining element 54 secured by means of screws 53. The embodiment shown in FIG. 6 is embodied substantially like the embodiment described above, except that the basic design is laterally reversed.

In this embodiment, instead of the washer 16, a plate spring 39 is provided, which in the state in which the housing 10' or the swivel arm housing 8' is screwed on, or in other words secured to the engine, presses the two housings against one another. Also in this embodiment, the friction bushing 27' is embodied such that it has an end wall section 40, which rests on an abutment face 41, in the form of an end face of the swivel arm housing 8', with a friction defined by the plate spring 39. The abutment face 41 is embodied in such a way, deviating from a flat configuration, that it has at least one cam protrusion 60 extending in the axial direction, which rests against a part of the swivel arm housing 8' in such a way that in the basic position of the operating state, the end wall section 40 of the friction bushing 27' rests against the abutment face 41 with reduced force, so that in this position, reduced friction is attained.

Figure 6:
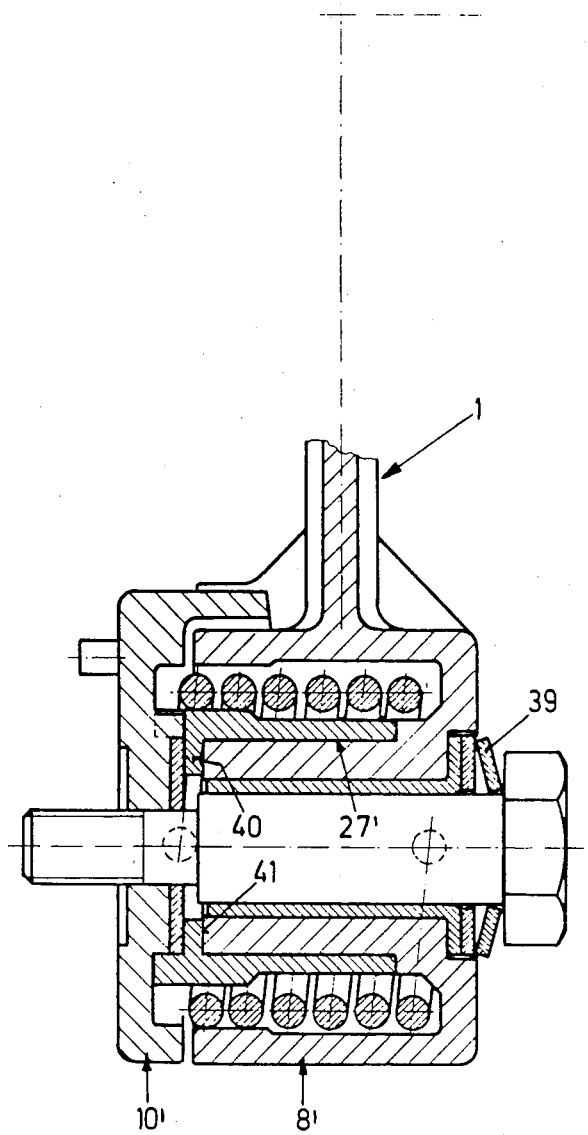
FIG. 6 is a sectional view, corresponding to FIG. 1, of the vicinity of the swivel arm housing in a modified embodiment.
Figure 9:
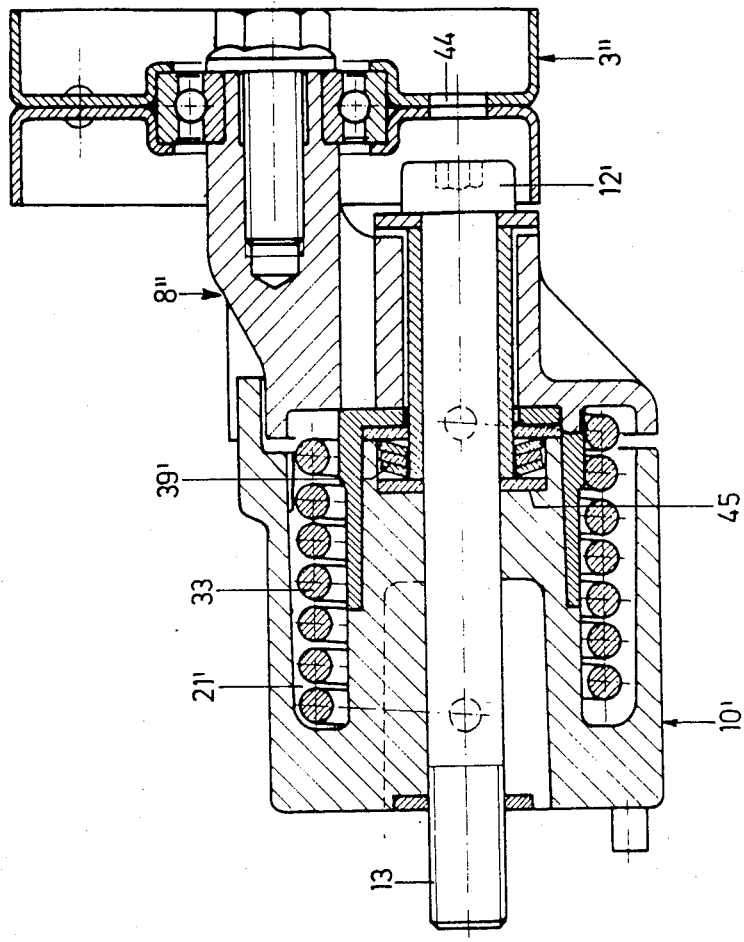
Figure 12A:
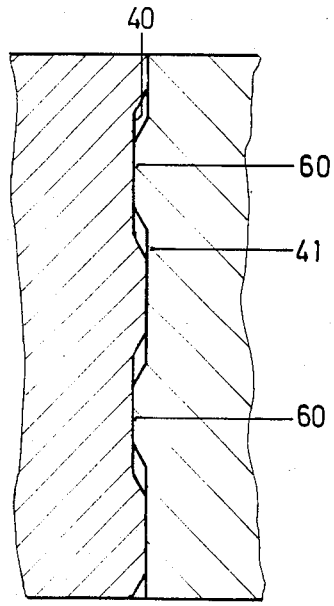
FIGS. 12 and 13 are detailed sections of the embodiments of FIGS. 6 and 9, respectively.
Figure 13A:
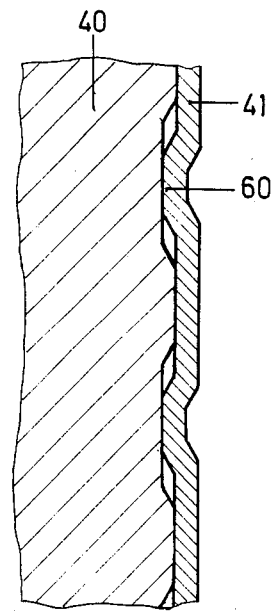
Figure 12B:
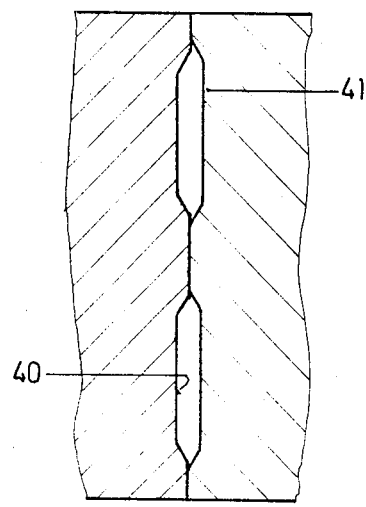
Figure 13B:
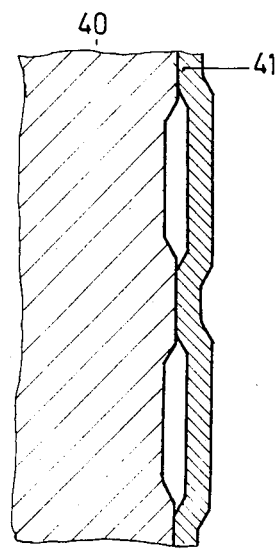

In FIGS. 12 and 13, respective sections through the vicinity of the end wall section 40 or the abutment face 41 are shown, for embodiments in accordance with FIGS. 6 and 9, respectively. FIG. 12a and FIG. 13a each show the basic operational state, while FIGS. 12b and 13b show an outwardly deflected state having increased frictional force.

Figure 7:
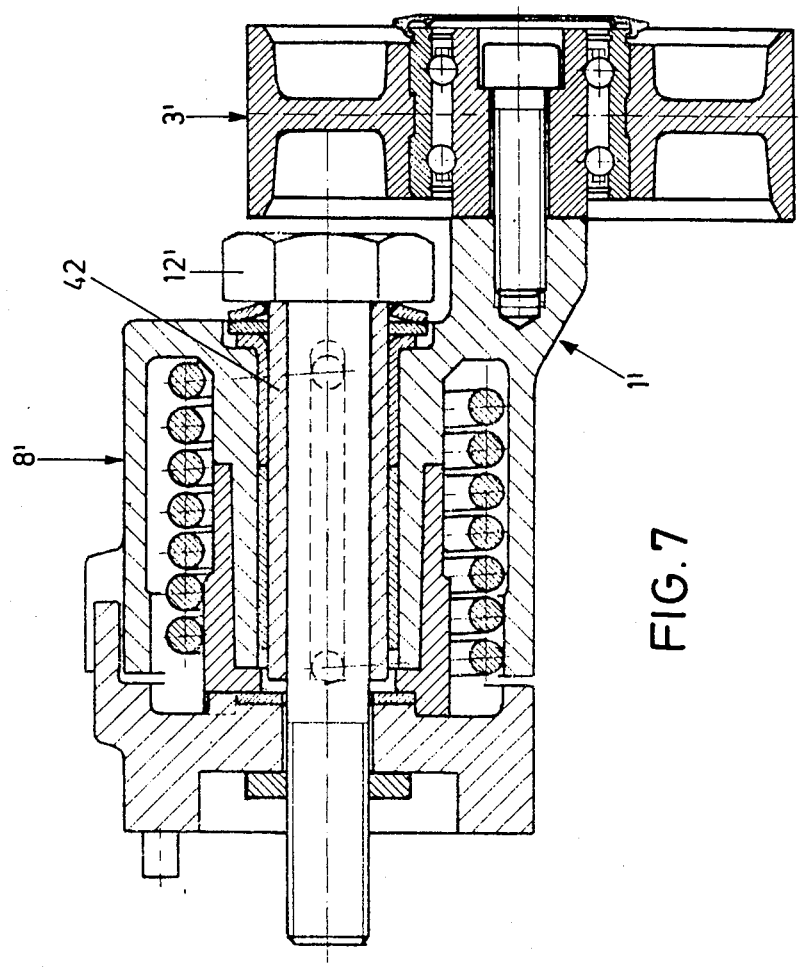
FIGS. 7–9 shows further sectional views of modified embodiments.

In a further embodiment, shown in FIG. 7, instead of the one-piece screw element 12, a conventional screw 12' having a thread is provided, over which a sheath 43 is placed. Also in this embodiment, the swivel arm 1' is made quite short, so that the belt diversion wheel 3' partly covers the swivel arm housing 8" in the radial direction. In this embodiment, the head of the screw 12' can be grasped from above by means of a wrench for assembly purposes.

Figure 8:
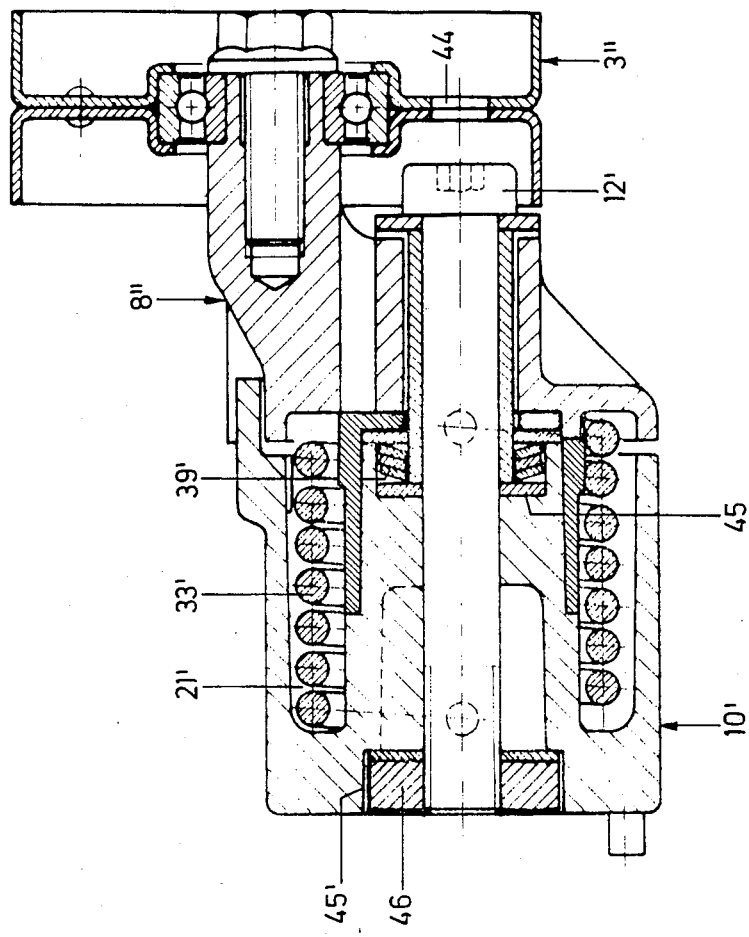

In the embodiment shown in FIGS. 8 and 9, the belt diversion wheel 3" has an opening 44, which enables actuation of the screw 12', provided with a socket head, for fastening purposes. In these embodiments shown in FIGS. 8 and 9, plate springs 30' are disposed not beneath the head of the screw 12' but instead are supported against an end face 45 of the housing part 10'. It is also provided in this embodiment that the helical spring 33 is disposed in an annular gap 21' that is accommodated in the stationary housing 10'. Accordingly, this exemplary embodiment shows that a kinematic reversal of the elements essential to the function of the invention between the swivel arm housing 8" and stationary housing 10' can readily be accomplished, while retaining the advantages according to the invention.

The embodiments of FIGS. 8 and 9 also differ in that in the embodiment of FIG. 9, in accordance with the above-described exemplary embodiments, a threaded portion 13 protrudes beyond the stationary housing 10', while in the embodiment of FIG. 8 the stationary housing 10' has a recess 45', which is engaged either by a retaining arm or by a nut 46 or the like welded to the engine block.

It is understood that various changes and modifications may be made, and features described in connection with any one of the embodiments may be used with any of the others, within the scope of the inventive concept.

What is claimed is:

1. A tensioning device for belts and the like, especially on motor vehicle engines, including a belt diversion wheel, which is rotatably supported at one end of a swivel arm, the other end of the swivel arm being pivotably supported between two end positions about a bearing bush, wherein a swivel arm housing connected to the swivel arm at least partly concentrically encompasses the bearing bush, defining an intervening open space wherein disposed in the intervening open space is a friction bushing comprising an elastically deformable material leaving an annular gap, and a helical spring is disposed in the still-remaining annular gap, the helical spring having ends connected in a rotationally fixed manner to the bearing bush or swivel arm housing, and the helical spring resting at least at some points against the friction bushing, the improvement comprising means for reducing or rescinding the pressing force of the helical spring against the friction bushing at predetermined swivel angle ranges.

2. A tightening device as defined by claim 1, wherein said means for reducing or rescinding comprises one wall for the annular gap which deviates from a circular cross section and correspondingly rests against the helical spring.

3. A tightening device as defined by claim 1, wherein the pressing force in the vicinity of end positions of the swivel arm is reduced or rescinded.

4. A tightening device as defined by claim 1, wherein the pressing force is reduced or rescinded in an intermediate position of the swivel arm, established as the basic position in the operating state.

5. A tightening device, in particular as defined by claim 4, wherein the swivel arm housing has a radially extending end face, which is in frictional contact with a stationary friction face.

6. A tightening device as defined by claim 5, wherein the end face is pressed against the abutment face by means of a plate spring.

7. A tightening device as defined by claim 5, wherein the abutment face has a configuration deviating from a flat face in such a manner that the least friction between the end face and the abutment face occurs in the intermediate position between the end positions of the swivel arm that is established as the basic position in the operating state.

8. A tighgening device as defined by claim 1, wherein a wall defining the annular gap opposite the friction bushing has at least one cam-like protrusion in the vicinity of the relative motion.

9. A tightening device as defined by claim 8, wherein the cam-like protrusion is disposed offset by approximately more than 90° with respect to one fixation point of the helical spring on the swivel arm housing.

10. A tightening device as defined by claim 9, wherein the cam-like protrusion is spring-loaded.

11. A tightening device as defined by claim 1, wherein one end of the helical spring is disposed in a rotationally fixed manner in a longitudinal recess that is radially outwardly closed.

12. A tightening device as defined by claim 1, wherein the friction bushing is embodied as stepped in the radial direction.

13. A tightening device as defined by claim 12, wherein the abutment face has a configuration deviating from a flat face in such a manner that the pressing force in the vicinity of the end positions is reduced or rescinded.

14. A tightening device as defined by claim 1, wherein a screw element axially penetrates and protrudes beyond the bearing bush, wherein a free end of the screw element engages the bore of a plastic washer which is disposed on the outside of the stationary housing part.

15. A tightening device as defined in claim 14, wherein the free end of the screw element is threaded.

16. A tightening device as defined by claim 1, wherein a hub of the belt diversion wheel has an opening.

* * * * *